(12) United States Patent
Portolan et al.

(10) Patent No.: US 9,183,105 B2
(45) Date of Patent: Nov. 10, 2015

(54) SYSTEMS AND METHODS FOR DYNAMIC SCAN SCHEDULING

(71) Applicants: Alcatel-Lucent USA, Murray Hill, NJ (US); Alcatel Lucent, Paris (FR)

(72) Inventors: Michele Portolan, Amboise (FR); Bradford Van Treuren, Lambertville, NJ (US); Suresh Goyal, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 334 days.

(21) Appl. No.: 13/758,306

(22) Filed: Feb. 4, 2013

(65) Prior Publication Data

US 2014/0223237 A1 Aug. 7, 2014

(51) Int. Cl.
*G06F 17/50* (2006.01)
*G06F 11/263* (2006.01)
*G06F 11/26* (2006.01)
(Continued)

(52) U.S. Cl.
CPC ...... *G06F 11/263* (2013.01); *G01R 31/318544* (2013.01); *G01R 31/318558* (2013.01); *G01R 31/3183* (2013.01); *G01R 31/318307* (2013.01); *G01R 31/318357* (2013.01); *G06F 11/3664* (2013.01); *G06F 11/3688* (2013.01); *G06F 17/5022* (2013.01); *G06F 17/5036* (2013.01); *G06F 17/5045* (2013.01); *G06F 2217/14* (2013.01); *G06F 2217/78* (2013.01); *G06F 2217/80* (2013.01)

(58) Field of Classification Search
CPC .................. G01R 31/3183; G01R 31/318307; G01R 31/318314; G01R 31/318357; G06F 17/5036; G06F 17/5022; G06F 17/5045; G06F 2217/14; G06F 2217/78; G06F 2217/80; G06F 11/3688; G06F 11/3664
USPC .......... 716/100, 136; 717/124, 132, 135, 127; 714/1, 25, 32–33
See application file for complete search history.

(56) References Cited

U.S. PATENT DOCUMENTS 5,694,399 A 12/1997 Jacobson et al.
5,828,579 A 10/1998 Beausang
(Continued)

OTHER PUBLICATIONS

Crouch, AI., Asset Intertech, Whitepaper: IEEE P1687 Internal JTAG (IJTAG) taps into embedded instrumentation, 2011, Asset Intertech. pp. 1-7.*

(Continued)

*Primary Examiner* — Stacy Whitmore
(74) *Attorney, Agent, or Firm* — McCormick, Paulding & Huber LLP

(57) ABSTRACT

A system and method for dynamically modifying scheduling of scan operations for a system under test includes a processing module configured to apply input test data to the system under test based on the scan operations via a test access port and a scheduler adapted to provide the processing module with scheduling for the plurality of scan operations. The scheduler includes a circuit model of the system under test. The circuit model includes at least one attribute providing enhancing information for at least a portion of the system under test. The scheduler is adapted to schedule the scan operations based on the circuit model and to modify the schedule based on the at least one attribute. The processing module is configured to receive the modified scheduled scan operations and to apply the input test data to the system under test based on the modified scheduled scan operations.

20 Claims, 4 Drawing Sheets

(51) Int. Cl.
*G01R 31/3185* (2006.01)
*G06F 11/36* (2006.01)
*G01R 31/3183* (2006.01)

(56) References Cited

U.S. PATENT DOCUMENTS

| | | | |
|---|---|---|---|
| 5,949,692 | A | 9/1999 | Beausang et al. |
| 6,061,709 | A | 5/2000 | Bronte |
| 6,106,568 | A | 8/2000 | Beausang et al. |
| 6,195,774 | B1 | 2/2001 | Jacobson |
| 6,370,663 | B1 | 4/2002 | Kudo |
| 6,453,456 | B1 | 9/2002 | Price |
| 6,640,322 | B1 | 10/2003 | Schulz |
| 6,832,539 | B2 | 12/2004 | Colby |
| 6,950,963 | B1* | 9/2005 | Parson et al. ............ 714/30 |
| 6,957,371 | B2 | 10/2005 | Ricchetti et al. |
| 7,073,110 | B1 | 7/2006 | Jacobson |
| 7,089,404 | B1* | 8/2006 | Rozas et al. ............ 712/217 |
| 7,139,950 | B2 | 11/2006 | Huisman et al. |
| 7,149,943 | B2 | 12/2006 | Van Treuren et al. |
| 7,383,478 | B1 | 6/2008 | Ballagh et al. |
| 7,467,342 | B2 | 12/2008 | Ricchetti et al. |
| 7,539,915 | B1 | 5/2009 | Solt |
| 8,001,433 | B1* | 8/2011 | Bhatia et al. ............ 714/729 |
| 8,429,593 | B1* | 4/2013 | Thirunavukarasu et al. . 716/136 |
| 8,443,326 | B1* | 5/2013 | Gupta et al. ............ 716/131 |
| 8,533,545 | B2* | 9/2013 | Goyal et al. ............ 714/726 |
| 8,595,681 | B1* | 11/2013 | Thirunavukarasu et al. . 716/136 |
| 8,621,301 | B2* | 12/2013 | Goyal et al. ............ 714/729 |
| 8,677,198 | B2* | 3/2014 | Goyal et al. ............ 714/726 |
| 8,719,649 | B2* | 5/2014 | Portolan et al. ............ 714/726 |
| 8,775,884 | B2* | 7/2014 | Portolan et al. ............ 714/729 |
| 2002/0010886 | A1 | 1/2002 | Tanaka et al. |
| 2002/0124216 | A1 | 9/2002 | Blasco Allue et al. |
| 2003/0163773 | A1 | 8/2003 | O'Brien et al. |
| 2003/0229834 | A1 | 12/2003 | Cooke |
| 2004/0025917 | A1 | 2/2004 | Gin et al. |
| 2004/0059437 | A1* | 3/2004 | Cullen et al. ............ 700/11 |
| 2004/0078179 | A1 | 4/2004 | Fuji et al. |
| 2004/0199927 | A1 | 10/2004 | Liu et al. |
| 2004/0222305 | A1 | 11/2004 | Leaming |
| 2005/0166092 | A1 | 7/2005 | Swoboda |
| 2005/0210345 | A1 | 9/2005 | Bybell |
| 2006/0095818 | A1 | 5/2006 | Bratt et al. |
| 2006/0236176 | A1 | 10/2006 | Alyamani et al. |
| 2006/0259828 | A1* | 11/2006 | Swoboda ............ 714/38 |
| 2008/0201497 | A1 | 8/2008 | Ooi |
| 2008/0281547 | A1 | 11/2008 | Nakamura et al. |
| 2009/0144592 | A1 | 6/2009 | Chakraborty et al. |
| 2010/0026378 | A1* | 2/2010 | Parker et al. ............ 327/538 |
| 2010/0229036 | A1* | 9/2010 | Goyal et al. ............ 714/25 |
| 2010/0229042 | A1* | 9/2010 | Goyal et al. ............ 714/31 |
| 2010/0229058 | A1 | 9/2010 | Goyal et al. |
| 2010/0293423 | A1* | 11/2010 | Goyal et al. ............ 714/726 |
| 2011/0214102 | A1* | 9/2011 | Desineni et al. ............ 716/136 |
| 2012/0117436 | A1* | 5/2012 | Portolan et al. ............ 714/738 |
| 2012/0137186 | A1* | 5/2012 | Portolan et al. ............ 714/727 |
| 2014/0082446 | A1* | 3/2014 | Wang et al. ............ 714/731 |
| 2014/0101627 | A1* | 4/2014 | Mochizuki ............ 716/106 |
| 2014/0223237 | A1* | 8/2014 | Portolan et al. ............ 714/33 |
| 2015/0040087 | A1* | 2/2015 | Lin et al. ............ 716/109 |

OTHER PUBLICATIONS

Zadegan, Farrokh, et al., "Reusing and retargeting on-chip instrument access procedures in IEEE P1687", 2012. IEEE, pp. 79-88.*
Japanese Office Action, Patent Application No. 2011-553067, Applicant (Alcatel-Lucent), Mar. 5, 2013, 3 pages.
Korean Notice of Preliminary Rejection, Patent Application No. 2011-7023268, Applicant (Alcatel-Lucent), Feb. 26, 2013, 3 pages.
Japanese office Action, Patent Application No. 2011-553072, Applicant (Alcatel-Lucent), Mar. 12, 2013, 6 pages.
Japanese Office Action, Patent Application No. 2011-553080, Applicant (Alcatel-Lucent), Mar. 7, 2013, 3 pages.
"JBits 3.0 SDK for Virtex-II," http://www.xilinx.com/labs/projects/jbits/,printed Feb. 9, 2010.
Xilinx Press Release #0396, "Xilinx Enables Reconfiguration Computing with Free JBits Software for use with Virtex-II FPGAS," http://www.xilinx.com/prs_ris/end_markets/03108jbits.htm,printed Feb. 9, 2010.
E. Keller and S. McMillan, An FPGA Wire Database for Run-Time Routers, Military and Aerospace Programmable Logic Devices (MAPLD) International Conference, 2002.
M. Portolan et al., "Scalable and Efficient Integrated Test Architecture," 2009 International Test Conference, 2002. Austin, Texas, Nov. 1-7, 2009 IEEE.
M. Portolan et al., "Test & Reliability: Preparing to the Next Step," Bell Labs Innovation Day, Dublin, Ireland, May 19-20, 2009.
"IEEE Standard Test Access Port and Boundary-Scan Architecture," IEEE Std. 1149.1-2001, IEEE, USA, 2001, IBSN: 0-7381-2944-5.
"Serial Vector Format Specification," Asset InterTech, Inc. Revision E, Mar. 8, 1999.
EIA/JEDEC Standard, Standard Test and Programming Language (STAPL), JEDS71, Aug. 1999.
GDB: The GNU Project Debugger, http://www.gnu.org/softward/gdt/, printed Nov. 5, 2009.
R.N. Joshi et al., "Evolution of IEEE 1149, 1Addressable Shadow Protocol Devices," Proceedings of the 2003 International Test Conference (ITC03), vol. 1, pp. 981-987, Sep. 30-Oct. 2, 2003.
"The SPARC Architecture Manual, Version 8," SPARC International Inc., http://www.sparc.org/standards0/8.pdf,1992.
M. Portolan et al., "A New Language Approach for IJTAG," Proceedings of the 2008 International Test Conference (ITC 09), Santa Clara, California, Oct. 28-30, 2008.
S. Anderson, "The Design of a Master Test Controller for a System-Level Embedded Boundary-Scan Test Architecture," 4th International Workshop on Board Testing (BTWO5), Nov. 2-4, 2005, pp. 1-24.
S. Anderson, "The Design of a Master Test Controller for a System-Level Embedded Boundary-Scan Test Architecture," 4th International Workshop on Board Testing (BTWO5), Nov. 2-4, 2005, Power Point slides 1-21.
C.J. Clark and M. Ricchetti, "Infrastructure IP for Configuration and Test of Boards and Systems," IEEE Design & Test of Computers, vol. 20, No. 3, May-Jun. 2003.
P. Sundararajan et. al., "Testing FPGA Devices Using JBits," Military and Aerospace Programmable Logic Devices (MAPLD) International Conference, Laurel, Maryland, Sep. 2001.
SN54LVT8980A, SN74LVT8980A, Embedded Test-Bus Controllers, IEEE STD 1149.1 (JTAG) Tap Masters with 8-bit Generic Host Interfaces, SCBS755B, Apr. 2002, Revised Mar. 2004, Texas Instruments.
Marinissen, E.; et al.; "On IEEE P1500's Standard for Embedded Core Test," Journal of Electronic Testing: Theory and Applications (JETTA), vol. 18, No. 4/5, pp. 365-383, Aug. 2002.
"IEEE Standard for Module Test and Maintenance Bus (MTM-BUS) Protocol," IEEE STD 1149.5-1995.
Miranda, Jose M., Van Treuren, Bradford G., "Embedded Boundary-Scan Testing," Proceedings of the Board Test Workshop, 2002.
"ARM1136JF-S and ARM1136J-S, Revision:r1p5, Technical Reference Manual," Chapter 11, ARM DD1 0211K, Feb. 20, 2009.
"VFP11 Vector Floating-point Coprocessor for ARM1136JF-S Processor r1p5, Technical Reference Manual," ARM DD1 0274H, Jul. 6, 2007.
Hopkins A B T et al: "Debug support for complex systems on-chip: a review" IEE Proceedings: Computers and Digital Techniques, IEE, GB, vol. 153, No. 4, Jul. 3, 2006, pp. 197-207, XP006026744, ISSN: 1350-2387.
Kuen-Jong Lee et al: "A unified test and dubug platform for SOC design", ASIC, 2009, ASICON '09. IEEE 8th International Conference On, IEEE, Piscataway, NJ, USA, Oct. 20, 2009, pp. 577-580, XP031578951, ISBN: 978-1-4244-3868-63 or 3870-9.
The International Search Report and the Written Opinion of the International Searching Authority, or the Declaration in PCT/US2010/026072; Alcatel-Lucent USA Inc., Applicant; mailed Aug. 13, 2010; 17 pages.

(56) References Cited

OTHER PUBLICATIONS

The International Search Report and the Written Opinion of the International Searching Authority, or the Declaration, in PCT/US2011/040420, Alcatel-Lcent USA Inc., Applicant, mailed Nov. 2, 2011, 12 pages.

The International Search Report and the Written Opinion of the International Searching Authority, or the Declaration in PCT/US2010/02622, Alcatel-Lucent USA Inc., Applicant, mailed Jun. 18, 2010, 16 pages.

Sep. 11, 2012 Office Action in EP 10 708 456.8, Alcatel Lucent, Applicant, 6 pages.

Multi-Ice Version 2.2, User Guide, ARM DUI 0048F, 1998-2002, 12 pages.

IEEE Std. 1500, "IEEE Standard Testability Method for Embedded Core-based Integrated Circuits," IEEE Computer Society, Aug. 29, 2005, http://grouper.ieee.org/groups/1500/.

P1687 homepage, http://grouper.ieee.org/groups/1687/, printed on Jan. 31, 2012.

Aeroflex Gaisler homepage, http://.gaisler.com, printed on Jan. 31, 2012.

A.W. Ley, "Doing More With Less—An IEEE 1149.7 Embedded Tutorial: Standard for Reduced-pin and Enhanced Functionality Test Access Port and Boundary-Scan Architecture," Proceedings of the 2009 International test Conference (ITC 09), Austin, TX, 2009.

Apr. 19, 2013 International Search Report and the Written Opinion of the International Searching Authority, or the Declaration, in PCT/US2012/061824, Alcatel Lucent, Applicant, 11 pages.

Kucuk G et al: "Distributed reorder buffer schemes for low power", Proceedings 2003 IEEE International Conference on Computer Design: VLSI in Computers and Processors. ICCD 2003. San Jose, CA, Oct. 13-15, 2003; (International Conference on Computer Design), Los Alamitos, CA, IEEE Comp. Soc, US, Oct. 13, 2003, pp. 364-370, XP010664113, DOI: 10.1109/ICCD.2003.1240920 ISBN: 978-0-7695-2025-4.

Decision of Rejection for Japanese patent Application No. 2011-553072, Dispatch Date Jul. 30, 2013, 2 pages.

PCT International Search Report dated May 8, 2014.

\* cited by examiner

SYSTEMS AND METHODS FOR DYNAMIC SCAN SCHEDULING

FIELD OF THE INVENTION

The present invention relates to scan scheduling.

BACKGROUND OF THE INVENTION

In a system testing environment, application of scan patterns to a system under test may increase stress on the system under test by forcing the system to execute tasks and behave in ways different from the mission mode of the system. This increased stress may cause important power consumption peaks and hot spots due to increased local activity within the system under test that require scan pattern adaptation and retargeting. Scan pattern adaptation and retargeting may also be required due various types of defects, such a process variance, and/or aging of the system that may alter the characteristics of the system under test.

SUMMARY

According to an embodiment, a computerized system comprises a processing module and a scheduler. The processing module is configured to receive a plurality of scan operations associated with a plurality of segments of a system under test and to generate input test data for the plurality of scan operations to be applied to the system under test. The scheduler includes a circuit model of the system under test defining the plurality of segments. The circuit model may include at least one attribute providing enhancing information for at least one segment of the plurality of segments. The scheduler is adapted to provide the processing module with scheduling for the plurality of scan operations based on the circuit model and to process the at least one attribute to dynamically modify the scheduling.

According to an embodiment, the computerized system may additionally include an assisting module in communication with the scheduler. The scheduler is adapted to provide the at least one attribute to the assisting module for processing.

According to an embodiment, the assisting module may be adapted to modify the scheduling based at least on the at least one attribute.

According to an embodiment, the assisting module may be adapted to modify the at least one attribute stored in the circuit module.

According to an embodiment, the computerized system may have at least one sensor monitoring the system under test and providing status information to the assisting module.

According to an embodiment, the at least one sensor may be a power consumption sensor or a thermal sensor.

According to an embodiment, the at least one attribute may include floorplan information on a location of the at least one sensor.

According to an embodiment, the circuit model may include a plurality of attributes for a plurality of nodes of the circuit model and each attribute may denote a power domain to which the node belongs.

According to an embodiment, the at least one attribute may include an authorization key.

According to an embodiment, a computerized method comprises the steps of receiving, at a scheduler, a plurality of access requests for access to a system under test and using a circuit model of the system under test to schedule a plurality of scan operations in response to the plurality of access requests. The computerized method also includes modifying at least a portion of the scheduled plurality of scan operations based on at least one attribute disposed in the circuit model and detected by the scheduler. The computerized method may further include generating input test data for testing the system under test based on the modified plurality of scan operations and applying the input test data to the system under test.

According to an embodiment, the computerized method may also comprise the step of monitoring, through at least one sensor, the system under test and modifying at least the portion of the scheduled plurality of scan operations based on information from the at least one sensor.

According to an embodiment, the at least one sensor may be a power consumption sensor or a thermal sensor.

According to an embodiment, the at least one attribute may include floorplan information on a location of the at least one sensor.

According to an embodiment, the computerized method may also comprise modifying the at least one attribute stored in the circuit module.

According to an embodiment, the circuit model may include a plurality of attributes for a plurality of nodes of the circuit model and each attribute may denote a power domain to which the node belongs.

According to an embodiment, a non-transitory, tangible computer-readable medium storing instructions adapted to be executed by a computer processor to perform a method may comprise the steps of receiving, at a scheduler, a plurality of access requests for access to a system under test and using a circuit model of the system under test to schedule a plurality of scan operations in response to the plurality of access requests. The computerized method also includes modifying at least a portion of the scheduled plurality of scan operations based on at least one attribute disposed in the circuit model and detected by the scheduler. The computerized method may further include generating input test data for testing the system under test based on the modified plurality of scan operations and applying the input test data to the system under test.

According to an embodiment, the method may further comprise the step of monitoring, through at least one sensor, the system under test and modifying at least the portion of the scheduled plurality of scan operations based on information from the at least one sensor.

According to an embodiment, the at least one sensor may be a power consumption sensor or a thermal sensor.

According to an embodiment the method may further comprise the step of modifying the at least one attribute stored in the circuit module.

According to an embodiment, the circuit model may include a plurality of attributes for a plurality of nodes of the circuit model and each attribute may denote a power domain to which the node belongs.

These and other embodiments of will become apparent in light of the following detailed description herein, with reference to the accompanying drawings.

DETAILED DESCRIPTION

Figure 1:
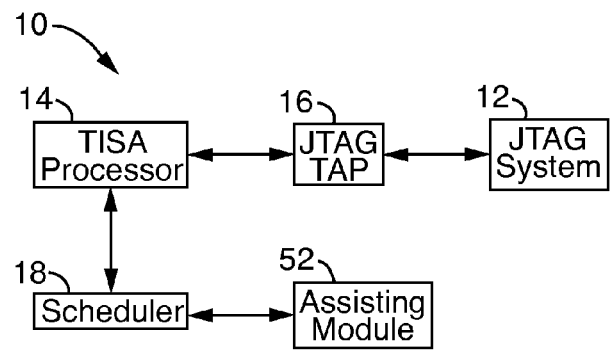
FIG. 1 is a block diagram of a testing environment according to an embodiment.

Referring to FIG. 1, a testing environment 10 for testing a Joint Test Action Group (JTAG) system 12 includes a test instruction set architecture (TISA) processor 14 in communication with the JTAG system 12 via a JTAG test access port (TAP) 16 and a scheduler 18 in communication with the TISA processor 14. The JTAG TAP 16 may be, for example, an IEEE 1149.1 TAP or the like.

U.S. Patent Application Publication No. 2012/0117436, which is incorporated herein by reference in its entirety, describes various systems and methods for performing testing of systems under test, including JTAG systems, by implementing a test instruction set architecture (TISA) that combines computer science capabilities with system testing capabilities. In general, the TISA combines the atomic operations of a software process with atomic scan operations of a test procedure. The software-based algorithms may utilize any suitable software programming language (e.g., C; C++, Java, TCL, Python or the like, as well as various combinations thereof) and may be implemented using any suitable processor. Use of TISA in a JTAG architecture enables scan operations to be performed at the Scan Segments Level, which allows the definition of independently controllable "scan segments" inside an overall scan path of the JTAG system. The TISA is able to perform scan operations on these independently controllable "scan segments" through position-based scheduling resolved at execution time.

Figure 2:
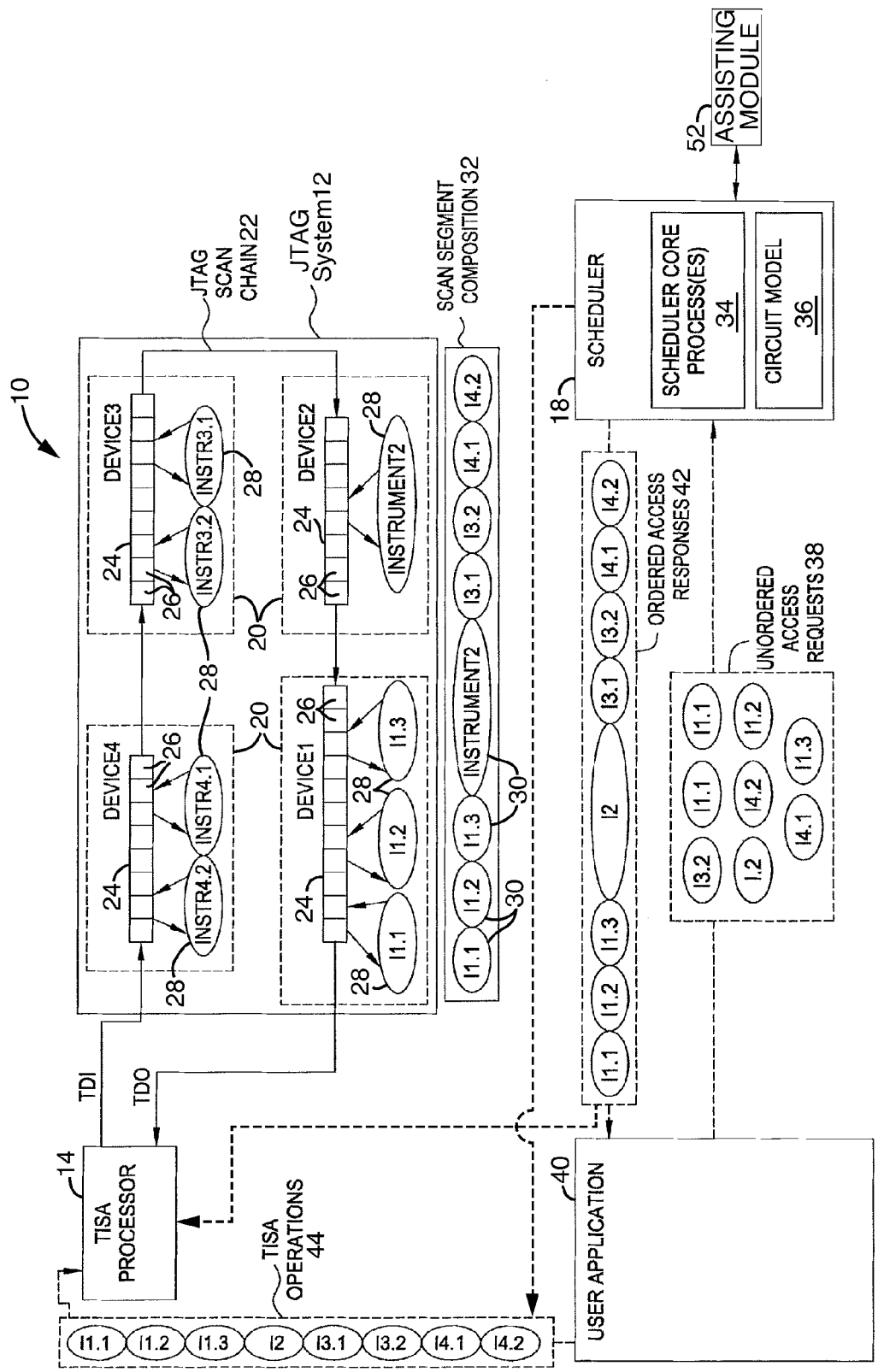
FIG. 2 is a schematic diagram of an embodiment for position-based scheduling in the testing environment of FIG. 1.

Referring to FIG. 2, the JTAG system 12 may include one or more devices 20 arranged serially within the JTAG system 12 to define a scan chain 22 that is accessible to the TISA processor 14 via the TAP 16, shown in FIG. 1. The scan chain 22 traverses the devices 20 of the JTAG system 12, which are denoted, in the direction from a Test Data In (TDI) pin of the TAP 16, shown in FIG. 1, to a Test Data Out (TDO) pin of the TAP 16, shown in FIG. 1, as Device 4, Device 3, Device 2 and Device 1. Each device 20 includes a plurality of registers 24 having elements 26 defining a plurality of instruments 28. As seen in FIG. 2, the JTAG system 12 includes eight instruments 28 disposed on the four devices 20 and accessible via the scan chain 22. The eight instruments 28 are considered, in the direction from TDI to TDO, as Instruments 4.2 and 4.1 (which are disposed, in series, on Device 4), Instruments 3.2 and 3.1 (which are disposed, in series, on Device 3), Instrument 2 (which is disposed on Device 2), and Instruments 1.3, 1.2 and 1.1 (which are disposed, in series, on Device 1). The eight instruments 28 are considered to be separate segments 30 of the JTAG scan chain 22. The segments 30 may be controlled individually and, thus, result in scan segment composition 32 (i.e. the scan chain 22 may be considered to be composed of a sequence of eight scan segments 30 which correspond to the eight instruments 28, rather than being composed of each of the registers 24 of each of the devices 20 of the scan chain 22).

Thus, the scan chain 22 is composed of a plurality of elements 26, and each segment 30 includes at least one of the elements 26 of the scan chain 22. The segments 30 may be defined at many levels of the JTAG system 12 under test (e.g. segments 30 may be devices 20, instruments 28, registers 24, segments of a register, and the like, as well as various combinations thereof). Thus, the segments 30 into which the scan chain 22 is decomposed may be defined at many levels of the JTAG system 12 under test. In this manner, the segment 30 may represent the smallest control unit of the scan chain 22.

The TISA processor 14 is adapted to execute boundary-scan testing of the JTAG system 12 by combining software-based algorithms with JTAG primitives. More specifically, the TISA processor 14 may perform scan operations at the segment level of JTAG scan chain 22, which results in the following advantages: (1) the operations on individual segments 30 are local (i.e. they are independent from the topology of which the segment is a part) and (2) an overall scan operation is composed by an ordered series of scan operations on the segments 30 of which the scan chain is composed.

In the testing environment 10, the scheduler 18 is adapted to dynamically schedule the boundary-scan access at the time of execution such that the notion of a "vector" is not necessary. Instead, the scheduler 18 may support position-based scheduling, which requires only the position of each segment 30 inside the scan chain 22. To support position-based scheduling, the scheduler 18 includes one or more scheduler core processes 34 and a circuit model 36 modeling the JTAG system 12. The scheduler core processes 34 are processes configured to perform position-based scheduling using the circuit model 36, as will be discussed in greater detail below.

The scheduler 18 is configured to receive access requests 38 from one or more user applications 40, perform position-based scheduling of the access requests 38 using the circuit model 36, and respond to the user application 40 or to the TISA processor 14 with access responses 42 indicative as to when TISA operations 44 (associated with the access requests 38 and access responses 42) may be performed on portions of the scan chain 22 of the JTAG system 12. Accordingly, a user application 40 needing access to one or more portions of the scan chain 22, e.g. to one or more particular segments 30, is configured to provide an access request 38 to the scheduler 18 for the desired segments 30. The scheduler 18 is configured to determine a schedule according to which the user application 40 may access the requested portions of the scan chain 22, thereby obviating the need for the user application 40 to compute the complete vector for the entire scan chain 22.

Figure 3:
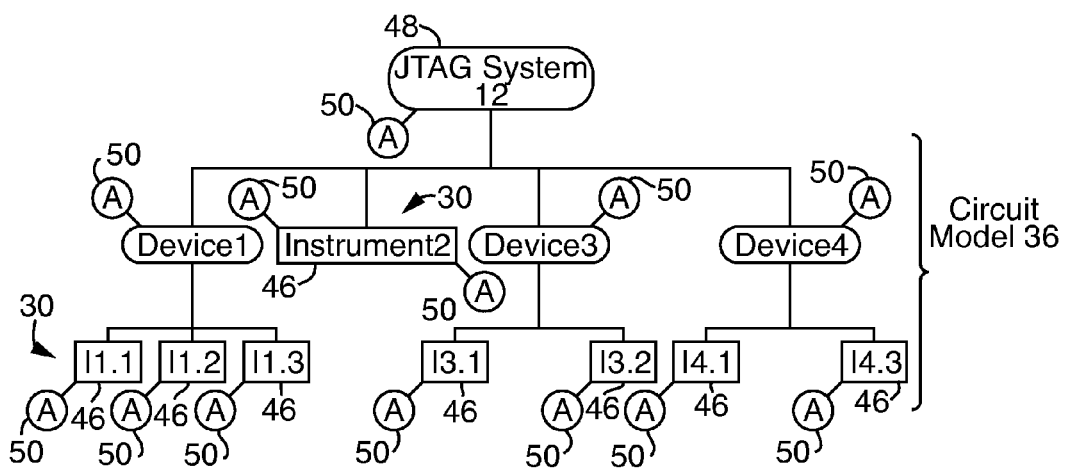
FIG. 3 is an embodiment of an exemplary circuit model of an exemplary scan chain of the system of FIG. 2.

Referring to FIG. 3, the circuit model 36 is a simplified model of the JTAG system 12 that is specified in terms of the scan segments 30 (e.g. Instruments 1.1, 1.2, 1.3, 2, 3.1, 3.2, 4.1 and 4.2) of which the scan chain 22, shown in FIG. 2, of JTAG system 12 is composed. In an embodiment, the circuit model 36 may be implemented using a tree structure. In the tree structure, each segment 30 of the JTAG scan chain 22 is represented as a leaf node 46 in the tree structure, and the remainder of the tree includes super-segments (disposed over one or more hierarchical levels) which represent the hierarchical nature of the JTAG scan chain 22. For example, a root node 48 of the tree structure represents the JTAG system 12 under test. The next level of the circuit model 36 include four nodes (denoted as Device 1, Instrument 2, Device 3, and Device 4, where the nodes for Devices 1, 3, and 4 each have additional nodes subtending therefrom and the node for Instrument 2 is a leaf node 46. The bottom level of the circuit model 36 includes seven leaf nodes 46 corresponding to the seven segments 30 of which some of the instruments 28, shown in FIG. 2, are composed (namely, the Device 1 node is a parent to three leaf nodes 46 which represent Instruments 1.1, 1.2, and 1.3 of which Device 1 is composed; the Device 3 node is a parent to two leaf nodes 46 which represent Instruments 3.1 and 3.2 of which Device 3 is composed; and the Device 4 node is a parent to two leaf nodes 46 which represent Instruments 4.1 and 4.2 of which Device 4 is composed). In the circuit model 36, the scan segments 30, i.e. leaf nodes 46, are depicted as rectangular-shaped nodes and the remaining nodes are depicted as oval-shaped nodes.

The tree structure of the circuit model 36 allows each scan segment 30, i.e. leaf node 46 of the tree structure, to be uniquely identified according to its path in the tree structure. For example, the segment 30 that represents Instrument 1.3 is uniquely identified by the path SUT.Device1.Instrument1.3., the segment 30 that represents Instrument 2 is uniquely identified by the path SUT.Instrument2, the segment 30 that represents Instrument 4.2 is uniquely identified by the path SUT.Device4.Instrument4.2, and so forth. Accordingly, a simple depth-first (also known as post-order) traversal of the tree structure provides the correct order of scan segments 30 of the scan chain 22, shown in FIG. 2, of JTAG system 12. Thus, the circuit model 36 is configured to specify the order of the scan segments 30 of the JTAG system 12 (e.g. as depicted in scan segment composition 32, shown in FIG. 2) through the depth-first transversal of the circuit model 36.

Still referring to FIG. 3, in an embodiment, the circuit model 36 may also include one or more attributes 50 attached to one or more nodes of the circuit model 36 that provide enhancing information to the scheduler 18, shown in FIG. 2, which the scheduler 18, shown in FIG. 2, may use to dynamically adapt the scan operations performed by the TISA processor 14 on the JTAG system 12, shown in FIG. 2, to the real scenario being experienced by the JTAG system 12, shown in FIG. 2, during testing. The attributes 50 of the circuit model 36 may include any information suitable for use by scheduler 18, shown in FIG. 2, in determining scheduling of access requests 38, shown in FIG. 2, and/or access responses 42, shown in FIG. 2, for execution of the corresponding TISA operations 44, shown in FIG. 2, by TISA processor 14, shown in FIG. 2. For example, the enhancing information provided by the one or more attributes 50 may be related to power consumption peaks and hot spots within the JTAG system 12, shown in FIG. 2, due to increased local activity within the JTAG system 12, shown in FIG. 2, various other types of defects, such a process variance, and/or aging of the system that may alter the characteristics of the JTAG system 12 when under test or any other similar information. This enhancing information provided by the one or more attributes 50 may be developed, for example, from a-priori knowledge (e.g. past testing of the JTAG system 12), from measurements of the JTAG system 12 when under test or a combination thereof. Although shown as additionally attributes 50 attached to the nodes of the circuit model 36, it should be understood by those skilled in the art that the attributes 50 may instead be provided as additional fields in each node of the circuit model 36.

Referring back to FIG. 2, the scheduler 18 reads the one or more attributes 50, shown in FIG. 3, during transversal of the circuit model 36 and feeds the one or more attributes 50, shown in FIG. 3 to an assisting module 52. In an embodiment, the assisting module 52 may be a program running on, or accessible to, the scheduler 18, while in some embodiments, the assisting module 52 may have some internal state, memory and/or the like. The assisting module 52 may perform one or more computations using the attributes 50, shown in FIG. 3, and may influence the outcome of the transversal, following the Visitor Design Pattern or another similar design pattern. For example, the assisting module 52 may force a neutral operation rather than the desired operation to reduce activity or can add and/or subtract one or more segments 30 from the scan chain 22, for example, by modifying value of hierarchy-enabling elements like the Segment Insertion Bit (SIB) from the P1687 standard. The outcome of the transversal performed by the scheduler 18 is, therefore, modified by the results of the assisting module 52.

Advantageously, in an embodiment, a traditional scheduler (i.e. a scheduler without the assisting module 52) may still processes the circuit model 36 by simply ignoring the attributes 50 disposed therein to specify the order of scan segments 30 of the scan chain 22 of JTAG system 12 according to the scan segment composition 32.

Although FIG. 2 and FIG. 3 have been shown and described with respect to the exemplary embodiments described herein, it will be understood by those skilled in the art that various changes in form and detail thereof may be made without departing from the spirit and the scope of the invention. For instance, in an embodiment, not all of the nodes of the circuit model 36 have to have an attribute 50 associated therewith. Additionally, in an embodiment, the assisting module 52 may modify one or more of the attributes 50 of the circuit model 36. In an embodiment, the circuit model 36 may include different types of attributes 50 disposed therein. For example, the circuit model 36 may include a first type of attributes 50 directed to process variance and a second type of attributes 50 directed to power consumption. In this embodiment, the system may include multiple assisting modules 52 such that each assisting module 52 processes a different type of attribute 50.

Figure 4:
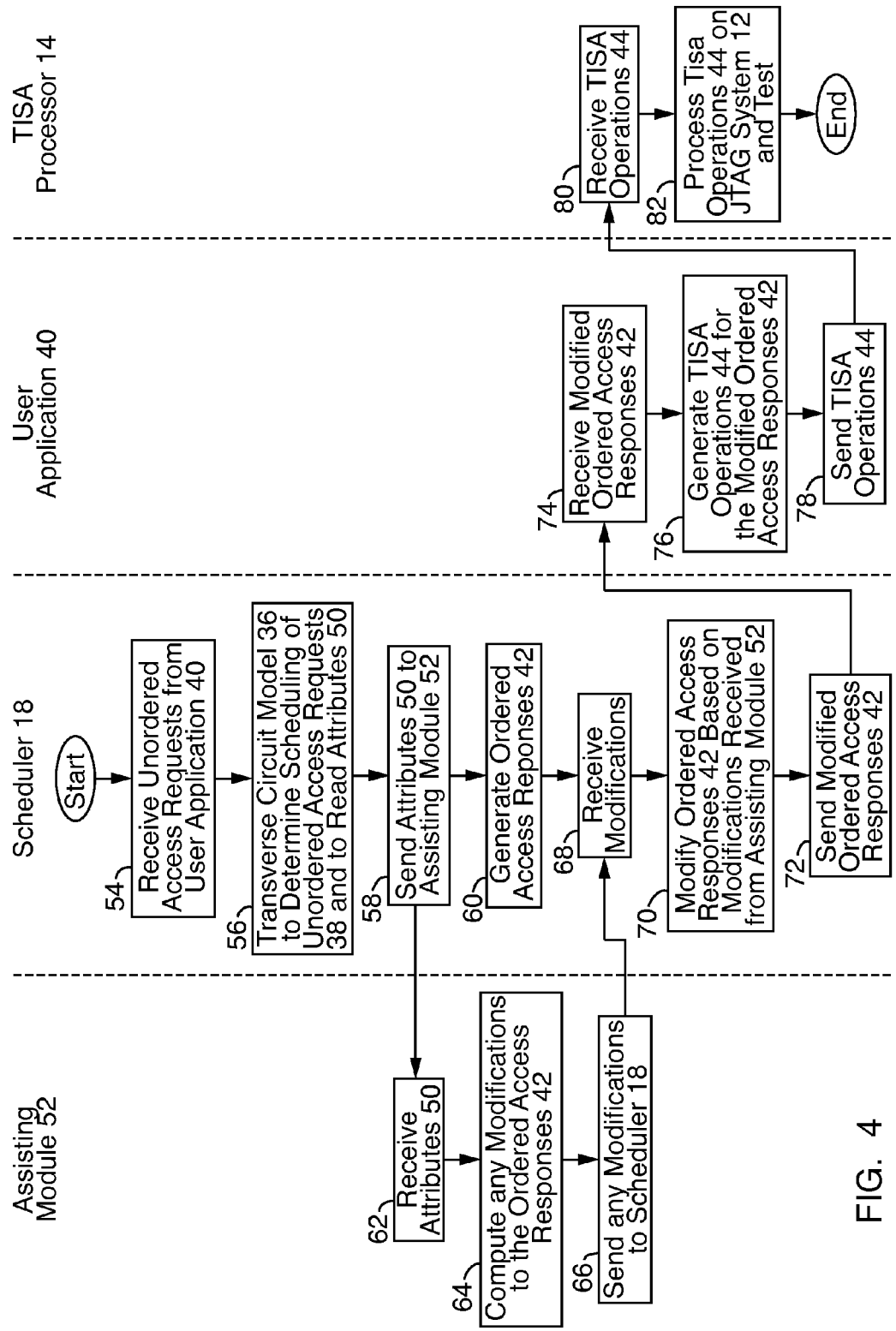
FIG. 4 is an embodiment for position-based scheduling in the testing environment of FIG. 1.

Referring to FIG. 4, in operation, an embodiment of a method for supporting position-based scheduling for testing JTAG system 12 begins at step 54 when the scheduler 18 receives unordered access requests 38 from one or more user applications 40 requesting access to one or more instruments 28 (i.e. segments 30), shown in FIG. 2, of the scan chain 22, shown in FIG. 2, of the JTAG system 12 under test. For example, in an embodiment, the user application 40 may issue access requests 38 for any of the instruments 28, shown in FIG. 2. The user application 40 does not have knowledge of the scan segment composition 32, shown in FIG. 2, of JTAG system 12 and, therefore, the user application 40 merely sends the scheduler 18 access requests 38 without accounting for the order in which the TISA operations 44 associated with the access requests 38 may be or should be applied to the JTAG system 12.

At step 56, the scheduler 18 performs the transversal of the circuit model 36 to determine scheduling of the unordered access requests 38 and to read the one or more attributes 50. The scheduler 18 determines scheduling of the unordered access requests 38 based on the scan segment composition 32, shown in FIG. 2, as defined in the circuit model 36 of JTAG system 12 under test, which is available to scheduler 18, as discussed above.

At step 58, the scheduler 18 sends the one or more attributes to the assisting module 52 for further analysis. The scheduler 18 then generates ordered access responses 42 based on the transversal of the circuit model 36 at step 60. The assisting module 52 receives the one or more attributes 50 from the scheduler 18 at step 62. At step 64, the assisting module 52 computes any modifications that should be made to the ordered access responses 42 using the one or more attributes 50. At step 66, the assisting module 52 sends any modifications to the scheduler 18. At step 68, the scheduler 18 receives the modifications from the assisting module 52 and, at step 70, modifies the ordered access responses 42 based on any modifications received from the assisting module 52. At step 72, the scheduler 18 sends the modified ordered access responses 42 to the user application 40. Thus, the scheduler 18 provides modified access responses 42 to user application 40, where the modified access responses 42 are indicative as to when the user application 40 may provide associated TISA operations 44 (associated with the access requests 38 and access responses 42) to TISA processor 14 for execution.

At step 74, the user application 40 receives the modified ordered access responses 42 from the scheduler 18 and, at step 76, the user application 40 generates TISA operations 44 associated with the modified ordered access responses 42 to be performed on the scan chain 22, shown in FIG. 2, of the JTAG system 12 based on the set of modified ordered access responses 42. At step 78, the user application 40 sends the TISA operations 44 to the TISA processor 14. At step 80, the TISA processor 14 receives the TISA operations 44. At step 82, the TISA processor 14 processes the TISA operations 44 to generate associated input test data and applies the input test data to the JTAG system 12 under test. Optionally, the TISA processor 14 may also receive output test data generated by JTAG system 12.

In this sense, the scheduler 18 processes a set of the unordered access requests 38 received from user application 40, generates a set of ordered access responses 42 (e.g. ordered in accordance with scan segment composition 32, shown in FIG. 2, as determined by scheduler 18 from circuit model 36) and then modifies, through the assisting module 52, the set of ordered access responses 42 based on enhancing information provided by the attributes 50. Thus, the scheduler 18 and assisting module 52 are able to advantageously adapt the set of ordered access responses 42 to more accurately model the JTAG system 12 when testing by modifying the set of ordered access responses 42 to account for various characteristics of the JTAG system 12 such as power consumption characteristics, heat generation characteristics and/or thermal dissipation due to increased local activity within the JTAG system 12, process variance, aging of the system and/or any other similar characteristics and/or system information. As discussed above, this enhancing information provided by the one or more attributes 50 may be developed, for example, from a-priori knowledge (e.g. past testing of the JTAG system 12), from measurements of the JTAG system 12 when under test or a combination thereof. The TISA processor 14 may then uses the modified set of ordered access responses 42 for processing of the JTAG system 12.

Although primarily depicted and described as being performed serially in a particular order, it should be understood by those skilled in the art that at least a portion of the steps of FIG. 4 may be performed contemporaneously and/or in a different order than depicted in FIG. 4. Additionally, although depicted and described within the context the user application 40 providing TISA operations 44 to the TISA processor 14 for simplicity, it is noted that in an embodiment, the scheduler 18 may be responsible for providing TISA operations 44 to the TISA processor 14 (i.e. the scheduler 18 may perform steps 74-78 of FIG. 4). In an embodiment, the assisting module 52 may also be incorporated into the scheduler 18 such that the scheduler 18 may be responsible for performing steps 62-66 of FIG. 4.

Figure 5:
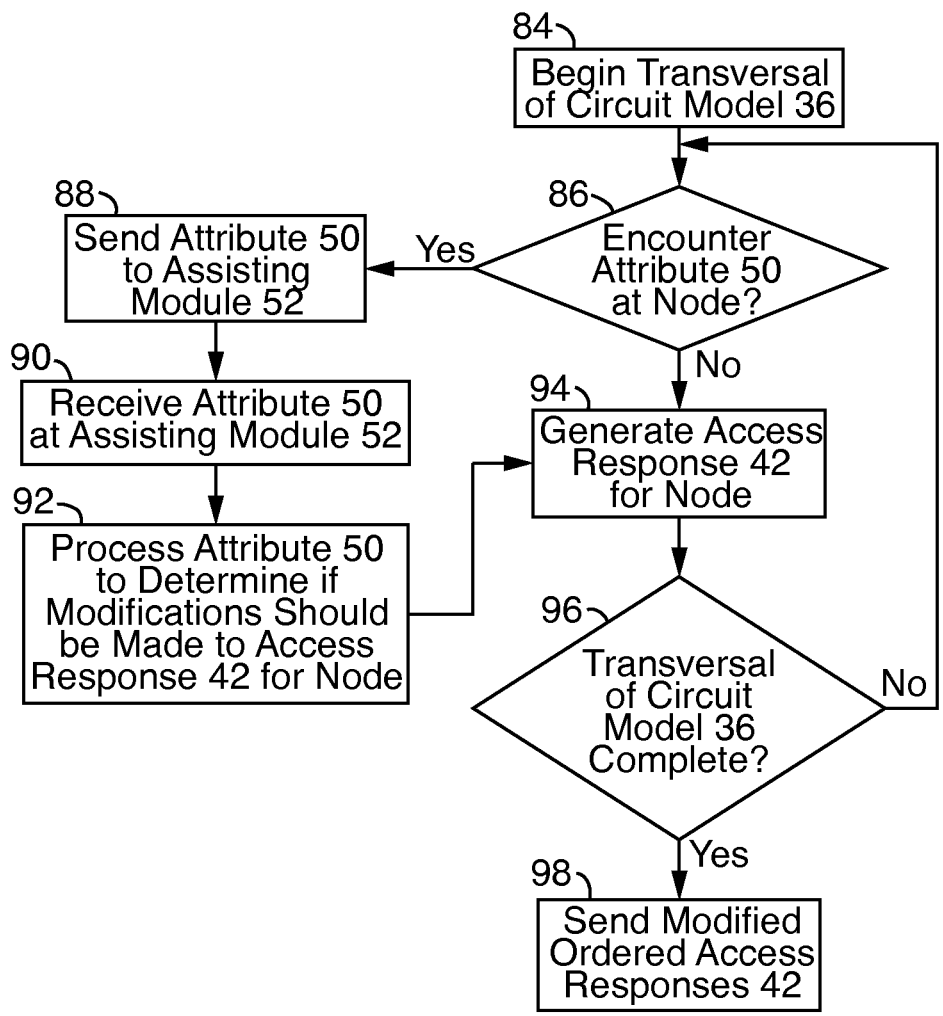
FIG. 5 is an embodiment for position-based scheduling in the testing environment of FIG. 1.

Referring to FIG. 5, in an embodiment, all of steps 56 to 70 of FIG. 4 may be implemented at the tree transversal level to allow the most direct and efficient application of the Visitor Design Pattern. At step 84, the scheduler 18, shown in FIG. 4, begins traversal of the circuit model 36. For example, the scheduler 18, shown in FIG. 4, may begin traversal upon receipt of unordered access requests at step 54 of FIG. 4. At step 86, the scheduler 18, shown in FIG. 4, evaluates whether an attribute 50 is encountered at a given node of the circuit model 36 during transversal. If an attribute is encountered, the scheduler 18, shown in FIG. 4, sends the attribute 50 of the given node to the assisting modules 52 at step 88. For example, the scheduler 18, shown in FIG. 4, may send the attribute 50 as soon as the scheduler 18, shown in FIG. 4, encounters the attribute 50 during the post-order transversal operation. At step 90, the assisting module 52 receives the attribute 50 from the scheduler 18, shown in FIG. 4. At step 92, the assisting module 52 processes the attribute 50 to determine if modifications should be made to the access response 42 for the given node. At step 94, the scheduler 18, shown in FIG. 4, generates the access response 42 for the given node, taking into account any modifications from the assisting module 52. Thus, the processing and response given by the assisting module 52 at step 92 is advantageously used to directly decide the tree transversal and the generation of access responses 42 by the scheduler 18, shown in FIG. 4. At step 96, the scheduler 18, shown in FIG. 4 evaluates whether transversal of the circuit model 36 is complete. If transversal is not complete, the scheduler 18, shown in FIG. 4, continues transversal, repeating the above steps for generating access responses 42. If the scheduler 18, shown in FIG. 4, determines that transversal of the circuit model is complete, the scheduler 18, shown in FIG. 4, sends the modified ordered access response 42 at step 98 to either the user application 40 or the TISA processor 14, shown in FIG. 4. The user application 40, shown in FIG. 4, and/or the TISA processor 14, shown in FIG. 4, then process and use the modified ordered access responses 42 as discussed above in steps 74-82 of FIG. 4. Processing the attributes 50 during tree transversal, as discussed above, advantageously allows for a direct and efficient application of the Visitor Design Pattern.

As discussed above, the attributes 50 may advantageously account for various characteristics of the JTAG system 12 such as power consumption characteristics, heat generation characteristics and/or thermal dissipation due to increased local activity within the JTAG system 12, process variance, aging of the system and/or any other similar characteristics and/or system information. Referring back to FIG. 2 and FIG. 3, in an embodiment, the attributes 50 may be implemented to account for power domain characteristics of a chip (i.e. the JTAG system 12) being tested. For example, modern chips are often composed by multiple, inter-dependent power domains, rather than one unique power source as in older chips, due to complex performance/power dissipation trade-offs and the like. Traditional boundary-scan testing tools cannot account for the power characteristics of the multiple, inter-dependent power domains because the information relating to which portions of the JTAG system 12 are being powered by specific power domains is usually not available at pattern generation time and, moreover, because the overall power state of a chip (i.e. JTAG system 12) may vary greatly during operation and testing. The enhanced TISA scheduling provided by the scheduler 18 having circuit model 26 with attributes 50 in conjunction with the assisting module 52 may advantageously solve the problems associated with multiple, inter-dependent power domains through the dynamic scheduling discussed above. For example, each node (e.g. leaf nodes 46, etc.) of the circuit model 36 may receive an attribute 50 denoting the power domain to which the node belongs. The assisting module 52 may read and modify the actual power state of the JTAG system 12 (e.g. through a dedicated interface, a scan-accessible instrument or the like), and may adapt the scan scheduling, as discussed above, based on the attributes 50 denoting power domains in conjunction with the actual power state of the JTAG system 12. For example, the assisting module 52 will take portions of the JTAG system 12 that are powered off out of the scan chain 22 to allow for correct operation. Additionally, upon receipt of access requests 38 to access powered-down sections of the JTAG system 12, the assisting module 52 may trigger a sequence to power-in said sections of the JTAG system 12. This may be accomplished, for example, by accessing a Power Controller for the JTAG system 12 as a P1687 instrument.

In an embodiment, the enhanced TISA scheduling provided by the scheduler 18 having circuit model 26 with attributes 50 in conjunction with the assisting module 52 may also dynamically monitor the power consumption within the JTAG system 12 and dynamically adapt to the actual conditions of the JTAG system 12. The assisting module 52 may obtain power consumption information from external instrumentation monitoring the JTAG system 12 (e.g. a monitor connected to a main chip power supply), through embedded P1687 instruments, which may provide a fine-grain resolution, or from other similar monitoring tools. At each scan operation 44, the scheduler 18 may call up the assisting module 52 to allow the assisting module 52 to collect and arrange the power consumption information by correlating the power consumption information with the scan activity. The power consumption information may be saved in an internal state (e.g. memory) of the assisting module 52, or written to the attributes 50 of the circuit model 36 and may be later used by the assisting module 52 to account for the power domain characteristics discussed above. The assisting module 52 may, therefore, be used as an inspection tool, obtaining a fine-grain correlation between scan/instrument activity and power consumption or be used to enforce constraints on the scan operations 44 to, for instance, reduce power glitches or the like.

In an embodiment, the enhanced TISA scheduling provided by the scheduler 18 having circuit model 26 with attributes 50 in conjunction with the assisting module 52 may also provide for monitoring and compensation of a thermal behavior of the JTAG system 12. Compensation for thermal behavior is similar to the power consumption compensation discussed above, except that thermal sensors are used instead of the power monitors. Monitoring and compensating for thermal characteristics of the JTAG system 12 may be particularly critical because the activity and, therefore, the thermal profile of a JTAG system 12 may be extremely different during testing than the thermal profile of the same JTAG system under nominal working conditions. For example, during testing, extremely localized test routines may cause specific portions of the JTAG system 12 to overheat, with risks of permanently damaging the system. The assisting module 52 may obtain information on the thermal behavior of the JTAG system 12 through thermal sensors, as discussed above, and may dynamically modify the test execution flow, e.g. the scan scheduling, based on the actual thermal state of the JTAG system 12. In this embodiment, the circuit model 36 may include attributes 50 providing floorplan information, i.e. positions of the different thermal sensors and scan chains 22 inside the JTAG system 12. The assisting module 52 may use this floorplan information to direct the scan operations 44 accordingly. For example, the assisting module 52 may suspend scan operations 44 around a detected hot spot to allow the hot spot to cool down or, if the JTAG system 12 includes scan-accessible cooling fans, the assisting module 52 may tune them accordingly.

In an embodiment, the enhanced TISA scheduling provided by the scheduler 18 having circuit model 26 with attributes 50 in conjunction with the assisting module 52 may provide an authentication scheme for secure scan access. In particular, there are many applications where providing access to the scan chain 22 could risk leaking sensitive information, either in terms of intellectual property (i.e. through reserve engineering) or security (i.e. if the device is an authentication device). Many devices restrict access due to these security concerns by making the device untestable (e.g. by disabling access, for instance, by burning or cutting away the TAP). The attributes 50 may advantageously provide an authentication scheme for secure scan access by storing authentication information, such as the pubic key of an asymmetric scheme or the like. The assisting module 52 would then need to receive a secret key provided by the chip provider to compare to the stored authentication information to authenticate and provide access to a particular instrument 28. In situations where access is not authorized by the assisting module 52, the assisting module 52 may generate an error or may forcefully bypass the particular instrument 28. The authentication scheme discussed above may also advantageously be implemented for other security reasons, such as to allow access only to licensed users or the like.

Although shown as separate elements in FIG. 1 and FIG. 2, for purposes of clarity and simplicity, it should be understood by those skilled in the art that one or more of the scheduler 18, assisting module 52, user application 40 and TISA processor 14 may be incorporated into a single device or software module running on one or more processors or the like. Additionally, it should be understood by those skilled in the art that communication between the various elements of testing environment 10, shown in FIG. 1 and FIG. 2, may be implemented in any suitable manner (e.g., depending on the number of devices used, the locations of the device, and the like). For example, in an embodiment, the scheduler 18 and the assisting module 52 may be combined in a single device that is separate from both the TISA processor 14 and the user application 40. In this embodiment, the separate devices may communicate with each other via one or more communication networks (e.g. via an Ethernet network, the Word Wide Web, a Bluetooth connection, wirelessly and the like, as well as various combinations thereof).

It is further noted that various elements of testing environment 10, shown in FIG. 1 and FIG. 2, such as the scheduler 18 and the assisting module 52, may be implemented using hardware, software and/or combinations thereof. For example, scheduler 18, user application 40 and/or assisting module 52 may each be implemented in hardware or as a software-based module stored in one or more memories and configured for execution by one or more processors (e.g., TISA processor 14 and/or any other suitable processor(s), which may depend on the locations of TISA processor 14, scheduler 18, assisting module 52 and/or user application 40). Similarly, the Scan-Segment Level features of TISA processor 14 might be emulated in software using techniques such as "bit bang". The testing environment 10, shown in FIG. 1 and FIG. 2, includes the necessary electronics, software, memory, storage, databases, firmware, logic/state machines, microprocessors, communication links, network interfaces, displays or other visual or audio user interfaces, printing devices, and any other input/output interfaces to perform the functions described herein and/or to achieve the results described herein. Suitable computer program code may be provided for executing numerous functions, including those discussed above for providing dynamic scan scheduling. The computer program code may also include program elements such as an operating system, a database management system and "device drivers" that allow one or more processors (such as the TISA processor 14) to interface with computer peripheral devices (e.g., a video display, a keyboard, a computer mouse, etc.).

The various processors and processes discussed herein, including the TISA processor 14, may include one or more conventional microprocessors and one or more supplementary co-processors such as math co-processors or the like. The data storage structures and memory discussed herein may comprise an appropriate combination of magnetic, optical and/or semiconductor memory, and may include, for example, RAM, ROM, flash drive and/or a hard disk or drive. The data storage structures and memory may store, for example, one or more operating systems and/or one or more programs (e.g., computer program code and/or a computer program product) adapted to direct the one or more processors according to the various embodiments discussed herein. The operating system and/or programs may be stored, for example, in a compressed, an uncompiled and/or an encrypted format, and may include computer program code. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs described above.

The term "computer-readable medium" as used herein refers to any medium that provides or participates in providing instructions to one or more processors (e.g. the TISA processor 14) of the test environment 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to one or more processors described herein for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the one or more processors. The system bus may carry the data to main memory, from which the one or more processors may retrieve and execute the instructions. The instructions received by main memory may optionally be stored in memory either before or after execution by the one or more processors. In addition, instructions may be received via a communication port as electrical, electromagnetic or optical signals, which are exemplary forms of wireless communications or data streams that carry various types of information.

The systems and methods for dynamic scan scheduling described herein provide for simplistic modeling of the JTAG system 12 under test through the circuit model 36 having attributes 50 disposed therein. The systems and methods described herein advantageously provide for scan pattern adaptation and retargeting by the scheduler 18 and assisting module 52 using attributes 50 to account for system characteristics, process variability and the like without requiring an extensive model of the JTAG system 12 under test. Thus, the systems and methods described herein may adapt the testing of the JTAG system 12 to model real scenarios in accordance with mission modes of the JTAG system 12. Additionally, the attributes 50 may be altered and rewritten to the circuit model 36 by the scheduler 18 and/or assisting module 52 so that the model may account for changes to the JTAG system 12 during testing.

Although this invention has been shown and described with respect to the detailed embodiments thereof, it will be understood by those skilled in the art that various changes in form and detail thereof may be made without departing from the spirit and the scope of the invention.

What is claimed is:

1. A computerized system comprising:
a processing module including a processor allowing the processing module to receive a plurality of scan operations associated with a plurality of segments of a system under test and to generate therefrom, through the processor, input test data configured to be applied to the system under test via a test access port; and
a scheduler including a second processor and a memory storing a circuit model of the system under test, the circuit model defining the plurality of segments of the system under test, the scheduler adapted to scan the circuit model stored in memory and provide the processing module with scheduling for the plurality of scan operations based on the circuit model stored in the memory;
wherein the circuit model includes, stored in the memory, at least one attribute providing enhancing information for at least one segment of the plurality of segments, the scheduler scanning the circuit model and processing the at least one attribute to dynamically modify the scheduling provided to the processing module based on the at least one attribute for the at least one segment.

2. The computerized system according to claim 1, additionally comprising:
an assisting module including a third processor in communication with the scheduler;
wherein the scheduler is adapted to provide the at least one attribute to the assisting module for processing.

3. The computerized system according to claim 2, wherein the assisting module is adapted to modify the scheduling based at least on the at least one attribute.

4. The computerized system according to claim 2, wherein the assisting module is adapted to modify the at least one attribute stored in the circuit model.

5. The computerized system according to claim 2, additionally comprising at least one sensor monitoring the system under test and providing status information to the third processor of the assisting module.

6. The computerized system according to claim 5, wherein the at least one sensor is a power consumption sensor or a thermal sensor.

7. The computerized system according to claim 6, wherein the at least one attribute includes floorplan information on a location of the at least one sensor.

8. The computerized system according to claim 1, wherein the circuit model includes a plurality of attributes stored in the memory for a plurality of nodes of the circuit model; and
wherein each attribute denotes a power domain to which the node belongs.

9. The computerized system according to claim 1, wherein the at least one attribute includes an authorization key.

10. A computerized method comprising the steps of:
receiving, at a scheduler including a processor and a memory, a plurality of access requests for access to a system under test;
using, by the processor of the scheduler, a circuit model of the system under test stored in the memory to schedule a plurality of scan operations in response to the plurality of access requests, the circuit model storing at least one attribute providing enhancing information for at least one segment of a plurality of segments of the system under test;
modifying, by the processor of the scheduler, at least a portion of the scheduled plurality of scan operations based on the at least one attribute for the at least one segment disposed in the circuit model stored in the memory and detected by the scheduler;
generating, by a second processor of a processing module, input test data for testing the system under test based on the modified plurality of scan operations; and
applying, by the second processor of the processing module, the input test data to the system under test.

11. The computerized method according to claim 10, additionally comprising the step of:
monitoring, through at least one sensor, the system under test;
wherein modifying at least the portion of the scheduled plurality of scan operations is based on information from the at least one sensor.

12. The computerized method according to claim 11, wherein the at least one sensor is a power consumption sensor or a thermal sensor.

13. The computerized method according to claim 12, wherein the at least one attribute includes floorplan information on a location of the at least one sensor.

14. The computerized method according to claim 10, additionally comprising the step of:
modifying in the memory the at least one attribute stored in the circuit model.

15. The computerized method according to claim 10, wherein the circuit model includes a plurality of attributes stored in the memory for a plurality of nodes of the circuit model; and
wherein each attribute denotes a power domain to which the node belongs.

16. A non-transitory, tangible computer-readable medium storing instructions adapted to be executed by at least one computer processor to perform a method comprising the steps of:
receiving, at a scheduler, a plurality of access requests for access to a system under test;
using a circuit model of the system under test to schedule a plurality of scan operations in response to the plurality of access requests, the circuit model storing at least one attribute providing enhancing information for at least one segment of a plurality of segments of the system under test;
modifying at least a portion of the scheduled plurality of scan operations based on the at least one attribute for the at least one segment disposed in the circuit model and detected by the scheduler;
generating input test data for testing the system under test based on the modified plurality of scan operations; and
applying the input test data to the system under test.

17. The non-transitory, tangible computer-readable medium of claim 16, wherein the method further comprises the step of:
monitoring, through at least one sensor, the system under test;
wherein modifying at least the portion of the scheduled plurality of scan operations is based on information from the at least one sensor.

18. The non-transitory, tangible computer-readable medium of claim 17, wherein the at least one sensor is a power consumption sensor or a thermal sensor.

19. The non-transitory, tangible computer-readable medium of claim 18, wherein the method further comprises the step of:
modifying the at least one attribute stored in the circuit model.

20. The non-transitory, tangible computer-readable medium of claim 16, wherein the circuit model includes a plurality of attributes for a plurality of nodes of the circuit model; and
wherein each attribute denotes a power domain to which the node belongs.

* * * * *